May 19, 1931.  F. B. THOMAS  1,805,645
SAFETY CAR EQUIPMENT
Filed Jan. 18, 1930
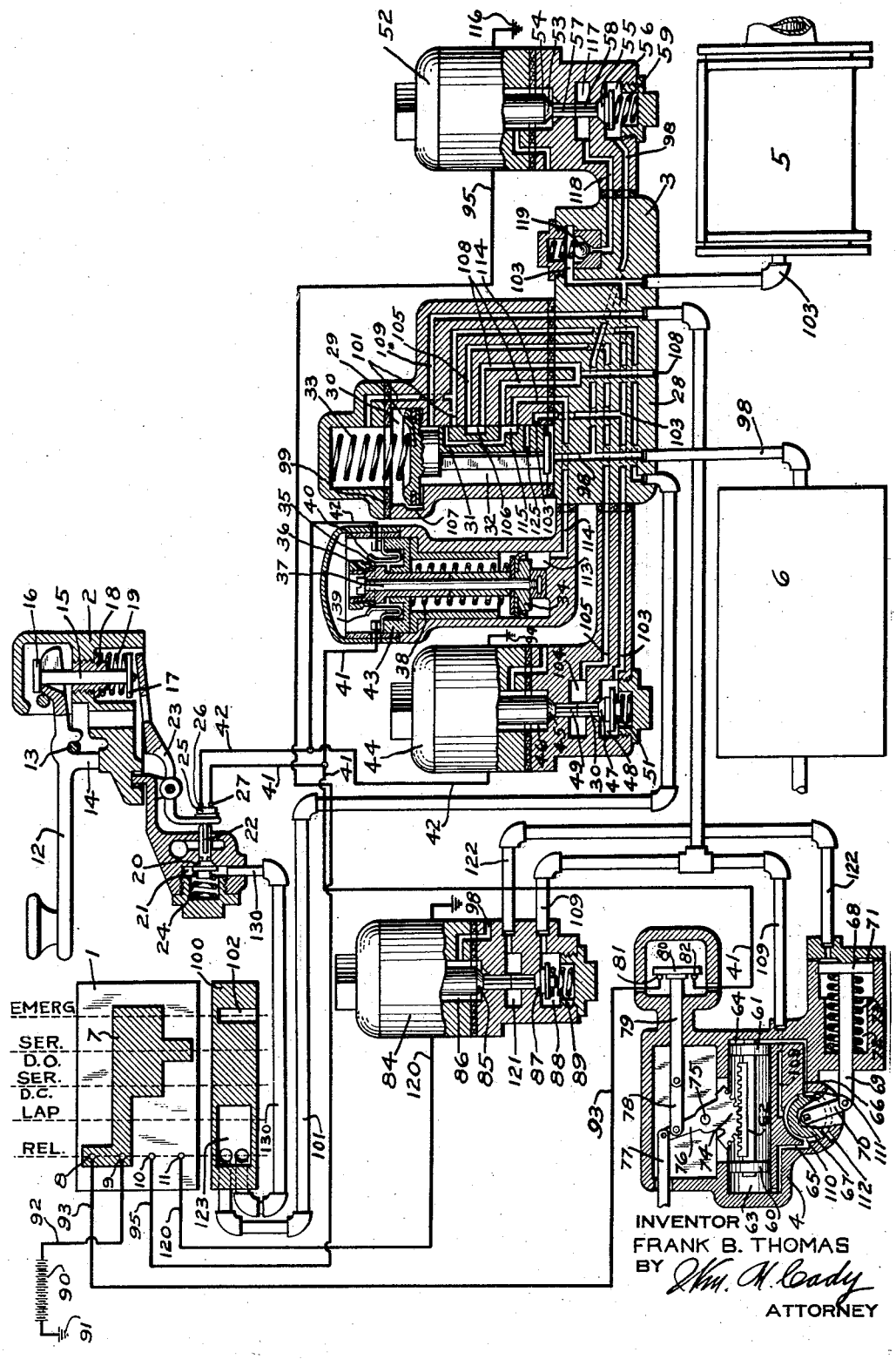
INVENTOR
FRANK B. THOMAS
BY
Wm. H. Cady
ATTORNEY Patented May 19, 1931

1,805,645

UNITED STATES PATENT OFFICE

FRANK B. THOMAS, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA

SAFETY CAR EQUIPMENT

Application filed January 18, 1930. Serial No. 421,639.

This invention relates to fluid pressure brakes and more particularly to an electro-pneumatic safety car equipment.

The principal object of my invention is to provide a safety car control equipment having improved means for preventing the release of the brakes when a car door is open.

Other objects and advantages will appear in the following more detailed description of my invention.

In the accompanying drawing, the single figure is a diagrammatic view, mainly in section, of a safety car control equipment embodying my invention.

As shown in the drawing, the safety car control equipment comprises a brake switch device 1, a safety control device 2, a brake control valve device 3, a door operating engine 4, a door engine magnet valve device, a brake cylinder 5 and a main reservoir 6.

The brake switch device 1 is shown in diagrammatic development form and may comprise a movable drum carrying an insulated contact 7 which is adapted to engage and connect with a plurality of stationary contacts 8, 9, 10 and 11 for controlling the brakes, as will be evident from the following more detailed description of operation of the equipment. Associated with the brake switch device is a valve 100, which is operative with the brake switch drum and which is adapted to control communication from an emergency pipe 101 to a safety control pipe 130 and an atmospheric port 102.

The safety control device 2 is adapted to be mounted on the usual power controller operating stem, which is operated in controlling the electric current to the car motors (not shown), and comprises a casing having a recess adapted to receive an operating handle 12 which is pivoted on a pin 13. A lug 14, carried by the handle 12, is adapted to engage the casing to limit downward movement of the handle. Carried in a slot in one end of the handle 12 is a pin 15, having at one end a head 16 engaging the upper face of the handle. The pin 15 extends through a wall 18 in the casing, and interposed between a washer 17 on the other end of said pin and the wall 18 is a spring 19 which tends to rotate the handle 12 in an upward direction.

A pilot valve 20 is contained in a chamber 21 and has a fluted stem 22 adapted to be engaged by one arm of a bell crank lever 23. The other arm of the bell crank lever is adapted to be engaged by the lower end of pin 15 for unseating said pilot valve against a spring 24. Normally, when the controller handle 12 is depressed and the pin 15 is pulled upwardly to the position shown in the drawing, the spring 24 maintains the pilot valve 20 seated and the bell crank lever in the position shown in the drawing, in which position a movable contact 25, carried by, but insulated from the bell crank lever, bridges two fixed contacts 26 and 27.

The brake control valve device 3 comprises an emergency valve device, an emergency switch device, a release magnet valve device and an application magnet valve device, all of said devices being preferably mounted on a common pipe bracket 28.

The emergency valve device comprises a piston 29 having at one side a chamber 30 and a slide valve 31 contained in a chamber 32 and adapted to be operated by said piston. A spring 33, contained in the chamber 30, engages piston 29 and urges said piston and the slide valve 31 toward the position shown in the drawing.

The emergency switch device comprises a piston 34, and a movable contact 35 mounted in a block 36 of insulating material, said block being operatively connected to the piston 34 by a bolt 37. A spring 38 is provided to urge the piston 34 to the normal position shown in the drawing, in which position the movable contact 35 is adapted to engage two fixed contacts 39 and 40 which are connected to wires 41 and 42, respectively. The fixed contacts 39 and 40 are mounted in a block 43 of insulating material which is carried by the casing and insulates said contacts from said casing and from each other.

The release magnet valve device comprises a magnet 44, a valve 45 contained in a chamber 46, and a valve 47 contained in a chamber 48. A spring 51 is provided in chamber 48 to seat valve 50 and unseat valve 45 when magnet 44 is deenergized.

The application magnet valve device comprises a magnet 52, a valve 53 contained in a chamber 54, and a valve 55 contained in a chamber 56. A spring 59 in chamber 56 is adapted to seat valve 55 and unseat valve 53 when the magnet 52 is deenergized.

The door operating engine 4 comprises two pistons 60 and 61 which are connected by a stem 62 provided on one side with a rack of gear teeth.

The piston 60 has at one side a chamber 63 and the piston 61 has at the opposite side a chamber 64. The chambers 63 and 64 are connected by passages 65 and 66, respectively, to a valve 67 adapted to control the fluid pressure in said chambers. For operating the valve 67, a piston 68 is provided having a stem 69 connected to an operating arm 70 which is secured to the valve. The piston 68 has at one side a chamber 71 and at the opposite side a chamber 72. A spring 73 contained in chamber 72 is adapted at one time to move the piston 68 and valve 67 to the door closed position shown in the drawing.

Engaging the gear toothed rack on stem 62 is a gear segment 74 fulcrumed on a pin 75. The segment 74 has an arm 76 to which is attached a rod 77, which is adapted to operate the car door (not shown). Also secured to the arm 76 is one end of a link 78, the other end of said link being fastened to a stem 79. The stem 79 is adapted to operate through a suitable bore in the casing and is provided at its outer end with a movable contact 80, which is insulated from the stem 79 and is adapted to normally bridge two fixed contacts 81 and 82.

For controlling the operation of the door engine piston 68, a door engine magnet valve device is provided and comprises a magnet 84, a valve 85 contained in a chamber 86, and a valve 87 contained in a chamber 88, said valves being adapted to be operated by said magnet. A spring 89 is provided in chamber 88 and is adapted to seat valve 87 and unseat valve 85 when the magnet 84 is deenergized.

In operation, the brake switch device 1 is normally carried in the release position, the controller handle 12 is normally depressed and the car door engine is in the door closed position, as shown in the drawing.

With the brake switch device in release position, the movable contact 7 connects the stationary contacts 9 and 8, so that electric current is permitted to flow from any suitable source of electrical energy, such as a battery 90, having a ground connection 91, through wire 92, contacts 9, 7 and 8, to wire 93 leading to the stationary contact 81 in the door engine. The door engine being in the door closed position, the movable contact 80 connects contacts 81 and 82 so that electric current is permitted to flow from contact 81 through contacts 80 and 82 to wire 41.

With the controller handle 12 depressed, spring 24 seats valve 20 and causes movable contact 25 on bell crank lever 23 to engage the fixed contacts 27 and 26, thereby permitting electric current to flow from wire 41 to wire 42 and from thence through the release magnet 44 to a ground 94. The release magnet is thereby energized and operates to seat valve 45 and unseat valve 47.

With the brake switch device in the release position, no current is supplied to stationary contact 10 which is connected through wire 95 to the application magnet 52. Consequently, the magnet 52 is deenergized and spring 59 seats the valve 55 and unseats the valve 53. Likewise, no current is supplied to the stationary contact 11 of the brake switch device, which contact is connected by wire 120 to the door engine magnet 84. The door engine magnet is thus normally deenergized, permitting spring 89 to seat valve 87 and unseat valve 85. The door engine piston chamber 71 is thus opened to the atmosphere through pipe 122, past the unseated magnet valve 85 and through an atmospheric exhaust port 98.

Fluid under pressure is supplied to the main reservoir 6 in the usual well known manner and flows therefrom through pipe and passage 98 to the application magnet valve chamber 56 and to the emergency valve chamber 32.

In initially charging the equipment, the pressure of fluid supplied to the emergency valve chamber 32 acts on the piston 29 and shifts said piston upwardly into engagement with a gasket 99. This moves the emergency slide valve 31 upwardly to emergency position in which a passage 103 is uncovered. Fluid under pressure then flows from valve chamber 32 through passage and pipe 103 to the brake cylinder 5 and applies the brakes.

The release magnet valve 47 being unseated by energization of magnet 44, fluid under pressure also flows from the brake cylinder passage 103, through chamber 48, past valve 47 to a chamber 104, and from thence through passage 105 to the seat of the emergency slide valve 31.

In emergency position of the emergency slide valve, a cavity 106 connects passage 105 to passage 101, which permits fluid under pressure to flow from passage 105 to passage 101 leading to the emergency piston chamber 30 and to the valve 100 in the brake switch device 1.

In release position of the brake switch device, pipe 101 is connected through cavity 123 in the valve 100 to the safety control pipe 130 leading to pilot valve chamber 21, and with the controller handle 12 depressed, the pilot valve 20 is seated. Thus, the fluid under pressure flowing to pipe 101 builds up a pressure in the emergency piston chamber 30, and when a predetermined pressure is obtained therein, the spring 33 shifts the piston 29 and slide valve 31 to the normal position shown in the drawing, in which position a feed groove 107 is opened and permits free communication between the opposite sides of the emergency piston 29, and consequently equalization of fluid pressures in piston chamber 30 and valve chamber 32.

In the normal position of the emergency slide valve, the passage 103 is lapped, thereby cutting off the supply of fluid under pressure to the brake cylinder 5, and the brake cylinder is opened to the atmosphere through pipe and passage 103, release magnet valve chamber 48, past unseated valve 47, through chamber 104, passage 105, cavity 106 in the emergency slide valve 31 and atmospheric passage 108, thereby permitting a release of the brakes.

In the normal position of the emergency slide valve, a passage 109 is uncovered, which permits fluid under pressure to flow from the emergency valve chamber 32 to the door control magnet valve chamber 88 and to valve 67 of the door operating engine 4. With the door engine valve 67 in the door closed position, as shown in the drawing, fluid under pressure is permitted to flow from passage 109, through a cavity 110 in the valve 67 to passage 65 leading to the piston chamber 63. The piston chamber 64 is open to the atmosphere through passage 66, cavity 111 in the valve 67 and an atmospheric exhaust passage 112. The pressure of fluid supplied to piston chamber 63 is thereby permitted to maintain the pistons 60 and 61 in the door closed position in which the movable contact 80 is held in engagement with the stationary contacts 81 and 82.

Also, with the emergency slide valve 31 in the normal position, the emergency switch piston chamber 113 is open to the atmosphere through passage 114, cavity 115 in the emergency slide valve 31, and atmospheric exhaust passage 108. This permits spring 38 to shift the switch piston 34 and movable contact 35 to the position shown in the drawing, in which contact 35 connects the contact 39 connected to wire 41 to contact 40 connected to wire 42. The wires 41 and 42 are thus connected through the controller handle switch contact 25 as well as through the emergency switch contact 35.

To effect a service application of the brakes, the drum of the brake switch device 1 is moved to service door closed position, in which the movable contact 7 connects stationary contact 9 from the battery 90 to stationary contact 10. Electric current is thus permitted to flow through contact 10, wire 95, and application magnet 52 to ground 116, thereby energizing said magnet. No connection is made to the release magnet stationary contact 8 in the brake switch device, so that the release magnet 44 is therefore deenergized, which permits spring 51 to seat valve 47 and unseat valve 45.

Energization of the application magnet 52 seats valve 53 and unseats valve 55, which permits fluid under pressure to flow from the main reservoir 6 through pipe and passage 98, past the unseated application magnet valve 55 to chamber 117 and from thence through passage 118, past a ball check valve 119 to passage and pipe 103, through which fluid under pressure flows to the brake cylinder 5 and applies the brakes.

When the desired degree of brake application is obtained, the brake switch device is moved to lap position in which the supply of electric current to the application magnet 52 is cut off. The application magnet is thereby deenergized, permitting spring 59 to seat valve 55 and prevent further flow of fluid under pressure to chamber 117 leading to the brake cylinder 5 through passage 118, past check valve 119 and through passage and pipe 103.

If it is desired to stop the car for taking on or discharging passengers, the brake switch device may be moved to service door closed position, in which fluid under pressure is supplied to the brake cylinder 5 in the same manner as hereinbefore described. When the car becomes substantially stopped, the operator may then move the brake switch device from service door closed position to the service door opening position.

In service door opening position of the brake switch device, the movable contact 7 engages the fixed contact 10, which is connected by wire 95 to the application magnet 52 and also the fixed contact 11, which is connected by wire 120 to the door engine magnet 84. The application magnet 52 is thereby maintained energized and maintains the brakes applied in the same manner as when applied in service door closed position of the brake switch device.

Electric current being supplied through wire 120 to the door engine magnet 84, energizes said magnet which operates to seat valve 85 aand unseat valve 87. The unseating of valve 87 permits fluid at main reservoir pressure to flow from pipe 109 through valve chamber 88, past valve 87, through chamber 121 and passage and pipe 122 to the piston chamber 71 of the valve controlling piston 68. The pressure of fluid in chamber 71 then moves piston 68 to the left, which rotates the valve 67 in a clockwise direction to door opening position, in which fluid under pressure is vented from the piston chamber 63 to the atmosphere through passage 65, cavity 111 in the valve 67, and atmospheric exhaust passage 112, and fluid under pressure is supplied to the piston chamber 64 from passage 109 through cavity 110 in the valve 67 and passage 66. The pressure of fluid in the piston chamber 64 then shifts the pistons 61 and 60 to the left, or door opening position.

The movement to the left of the door engine pistons 60 and 61, causes the gear segment 74 to rotate in a clockwise direction which operates arm 76 to pull rod 77 to open the car door (not shown). At the same time, the link 78 is operated to shift the switch stem 79 and switch contact 80 to the right, so that contact 80 disengages the fixed contacts 81 and 82, which are connected to wires 93 and 41, respectively, both of which wires are in the release magnet circuit.

To release the brakes after taking on or discharging passengers, the brake switch device is moved to release position, in which the stationary contact 7 again connects the current supply wire contact 9 to the release magnet wire contact 8 and the current supply is cut off from the application magnet wire contact 10 and door opening magnet wire contact 11.

The application magnet 52 is thus deenergized and permits spring 59 to seat valve 55 so as to cut off the supply of fluid under pressure to the brake cylinder. The door engine magnet 84 is also deenergized, which permits spring 89 to seat valve 87 and unseat valve 85. The unseating of magnet valve 85 permits fluid under pressure to be vented from the piston chamber 71 through passage and pipe 122, chamber 121 in the door engine magnet, past the unseated valve 85 and through the atmospheric passage 98. With the fluid under pressure thus vented from the piston chamber 71, spring 73 moves piston 68 to the door closed position shown in the drawing. This movement of piston 68 turns the valve 67 to door closed position, in which fluid under pressure is vented from piston chamber 64 through passage 66, cavity 111 in the valve 67, and atmospheric passage 112 and fluid under pressure is supplied to piston chamber 63 from passage 109 by way of cavity 110 in the valve 67 and passage 65.

The fluid under pressure supplied to piston chamber 63 shifts the pistons 60 and 61 to door closed position, in which the gear segment is returned to the position shown in the drawing, thereby operating rod 77 to close the car door and also operating the movable contact 80 to bridge fixed contacts 81 and 82.

The bridging of contacts 81 and 82 connects wire 93 from the brake switch device to wire 41. Wire 41 is connected to release magnet wire 42 through the controller handle switch contact 25 when the handle 12 is depressed, and also through the emergency switch contact 35. Electric current is thus supplied to the release magnet 44, which becomes energized and seats valve 45 and unseats valve 47.

The unseating of release magnet valve 47 connects the brake cylinder passage 103 to passage 105 which permits fluid under pressure to flow from the brake cylinder 5 through said passages, cavity 106 in the emergency slide valve 31, and atmospheric passage 108, thereby effecting a release of the brakes.

It will be noted from the above description of operation that the release magnet 44 is not energized to release the brakes upon movement of the brake switch device to release position so long as the door engine remains in the door open position, since the release magnet circuit is then open at the door engine switch 80. However, upon movement of the door engine to door closed position, the switch 80 is operated to close the release magnet circuit after which the release magnet will be energized and will operate to effect a release of the brakes.

To effect an emergency application of the brakes, the brake switch device is moved to emergency position in which the movable contact 7 engages the application magnet stationary contact 10, thus supplying electric current through wire 95 to the application magnet 52 which becomes energized and operates to supply fluid under pressure from the main reservoir 6 to the brake cylinder in the same manner as when a service application of the brakes is effected.

In emergency position of the brake switch device 1, the emergency pipe 101 is also connected to the atmosphere through the atmospheric exhaust port 102 in the valve 100. Since the emergency pipe 101 is connected to the emergency piston chamber 30, fluid under pressure is thereby vented from said chamber. The pressure of fluid in the emergency valve chamber 32 then shifts the emergency piston 29 and slide valve 31 upwardly to emergency position, in which passage 103 is uncovered and permits fluid at main reservoir pressure to flow from the emergency valve chamber 32 through passage and pipe 103 to the brake cylinder 5. Fluid under pressure is thus supplied to the brake cylinder in emergency by operation of both the emergency valve device and application magnet valve device and thereby effects an emergency application of the brakes.

In emergency position of the emergency slide valve, a port 125 in said slide valve registers with passage 114 and permits fluid under pressure to flow from the valve chamber 32 to the emergency switch piston chamber 113. The pressure in chamber 113 then shifts the piston 34 upwardly, causing the movable switch contact 35 to be moved out of engagement with the fixed contacts 39 and 40. Furthermore, the door engine supply passage 109 is connected to the atmosphere through cavity 115 in the emergency slide valve 31 and atmospheric passage 108. The door engine piston chamber 63 being connected to supply passage 109 through passage 65 and cavity 110 in the door valve 67, fluid under pressure is vented therefrom. Since the piston chamber 64 is at atmospheric pressure in the door closed position of the door engine, the door engine pistons 60 and 61 are balanced as to fluid pressure so as to permit hand operation of the door, if desired.

To release the brakes after an emergency application is effected as just described, the brake switch device is moved to release position in which the current supply wire 92 is connected to wire 93. The door engine must then be manually shifted to closed position, which causes switch 80 to bridge contacts 81 and 82 and thus connect wire 93 to wire 41. The controller handle 12 is then depressed to permit spring 24 to seat pilot valve 20 and move contact 25 into engagement with contacts 26 and 27 so as to connect wire 41 to wire 42 leading to the release magnet 44. A circuit is thus closed through the battery 90 and release magnet, but in order to close said circuit it will be noted that the car door must be closed, the brake valve must be moved to release position, and the controller handle 12 must be depressed.

The energization of the release magnet 44 seats valve 45 and unseats valve 47. Fluid under pressure is thereby permitted to flow from main reservoir 6 through pipe and passage 98, emergency valve chamber 32, passage 103, past the unseated release magnet valve 47, through chamber 104, passage 105, cavity 106 in the emergency slide valve 31 and passage 101 to the emergency piston chamber 30 and to the brake switch device 1. In release position of the brake switch device, the emergency pipe 101 is connected through cavity 123 to the safety control pipe 130, which, however, is lapped in the safety control device by the pilot valve 20 being seated. Fluid pressure is thus permitted to build up in the emergency piston chamber 30 and when a predetermined pressure is thus obtained in said piston chamber, the spring 33 shifts the emergency piston 29 and slide valve 31 to their normal position.

In the normal position of the emergency slide valve, the brake cylinder 5 is opened to the atmosphere through pipe and passage 103, past the release magnet valve 47, through chamber 104, passage 105, cavity 106 in the emergency slide valve and atmospheric passage 108, thereby permitting a release of the brakes. At the same time as the brakes are thus released, fluid under pressure is vented from the emergency switch piston chamber 113 through passage 114, cavity 115 in the emergency slide valve and atmospheric passage 108. Spring 38 then shifts the emergency switch piston 34 downwardly to its normal position, in which switch contact 35 again connects contacts 39 and 40.

If for any reason, the operator becomes incapacitated when the brake switch device 1 is in either release or lap position and lets go of the controller handle 12, the pressure of spring 19 acts through the pin 15 so as to depress the right arm of the bell crank lever 23 and thereby cause the movement of the left arm to unseat the pilot valve 20. Unseating of the pilot valve vents fluid under pressure from the safety control pipe 130. The safety control pipe being connected through cavity 123 of valve 100 in the brake switch device, to the emergency pipe 101, fluid under pressure is vented from the emergency pipe and thus from the emergency piston chamber 30. An emergency application of the brakes is thereby effected by operation of the emergency piston 29 and slide valve 31 in the same manner as hereinbefore described.

To release the brakes after an emergency application of the brakes as effected in the manner just described, the controller handle 12 is depressed, and with the car door engine in the door closed position and the brake switch device in the release position, the brakes will be released in the same manner as hereinbefore described.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a door engine for controlling the opening and closing of a car door, a handle, and electrically operated means for controlling the release of the brakes, of means controlled by said handle and means controlled by said door engine for preventing the operation of said electrically operated means to effect a release of the brakes.

2. The combination with a door engine for controlling the opening and closing of a car door, and a power controller handle for controlling the car motor circuit, of a magnet valve device adapted upon energization to effect the release of the brakes and upon deenergization to prevent the release of the brakes, a switch device associated with said door engine and another switch device associated with said power controller handle, said switch devices being adapted to control the circuit of said magnet valve device.

3. The combination with a door engine for controlling the opening and closing of a car door, and a power controller handle for controlling the car motor circuit, of a magnet valve device adapted upon energization to effect the release of the brakes and upon deenergization to prevent the release of the brakes, a switch device associated with said door engine and another switch device associated with said power controller handle and in series with said door engine switch device, either of said switch devices being adapted to control the circuit of said magnet valve device independently of the other switch device.

4. The combination with a door engine for controlling the opening and closing of a car door, and a depressible power controller handle for controlling the car motor circuit, of a magnet valve device adapted upon energization to effect the release of the brakes and upon deenergization to prevent the release of the brakes, a switch device associated with said door engine and another switch device associated with said power controller handle, said switch devices being operated when the door engine is in position for closing the car door and when the power controller handle is depressed for closing the circuit of said magnet valve device, and when the door engine is in position for opening the car door and the power controller handle is not depressed, for opening said circuit.

5. The combination with a door engine for controlling the opening and closing of a car door, of a valve for controlling the release of the brakes, a magnet for controlling said valve, a switch device associated with said door engine, a power controller handle, a switch device associated with said power controller handle, a manually operated switch device, said switch devices being arranged in series to control the circuit through said magnet.

6. In a fluid pressure brake, the combination with a brake cylinder, of an emergency valve device operative in emergency position to supply fluid under pressure to said brake cylinder to effect an application of the brakes, a release magnet valve device operative when energized to control the venting of fluid under pressure from said brake cylinder, an emergency switch device operative in the emergency position of said emergency valve device to open one circuit through said release magnet valve device for deenergizing same to prevent venting of fluid under pressure from said brake cylinder, a switch device associated with a power controller handle and arranged in parallel with said emergency switch device for opening another circuit through said release magnet valve device, and a switch device associated with a door engine and arranged in circuit with said two parallel arranged switches and operative when said door engine is in position for opening a car door for opening the circuit of said release magnet valve device for preventing the venting of fluid under pressure from said brake cylinder.

7. The combination with a door engine for controlling a car door, of a magnet valve device for controlling the operation of said door engine, a release magnet valve device for controlling the release of the brakes, means controlled by said door engine for controlling the circuit of said release magnet valve device and a brake switch device operative by an operator for controlling the circuit of said magnet valve device and arranged in series with said means and release magnet valve device for also controlling the circuit of said release magnet valve device.

In testimony whereof I have hereunto set my hand, this 16th day of January, 1930.

FRANK B. THOMAS.